(12) United States Patent
Contin et al.

(10) Patent No.: US 6,854,708 B2
(45) Date of Patent: Feb. 15, 2005

(54) HIGH-VACUUM VALVE WITH RETRACTABLE VALVE PLATE TO ELIMINATE ABRASION

(75) Inventors: Jose L. Contin, Alameda, CA (US); Neli Ulea, San Ramon, CA (US)

(73) Assignee: MDC Vacuum Products Corporation, Hayward, CA (US)

(*) Notice: Subject to any disclaimer, the term of this patent is extended or adjusted under 35 U.S.C. 154(b) by 0 days.

(21) Appl. No.: 10/624,083

(22) Filed: Jul. 21, 2003

(65) Prior Publication Data

US 2004/0079915 A1 Apr. 29, 2004

Related U.S. Application Data

(60) Provisional application No. 60/397,917, filed on Jul. 22, 2002.

(51) Int. Cl.[7] .................................................. F16K 3/28
(52) U.S. Cl. ........................ 251/167; 251/178; 251/187; 251/195; 251/327
(58) Field of Search ................................. 251/167, 176, 251/178, 187, 193, 195, 326, 327

(56) References Cited

U.S. PATENT DOCUMENTS

| | | | |
|---|---|---|---|
| 4,640,302 A | * 2/1987 | Impey | 137/15.18 |
| 4,681,329 A | 7/1987 | Contin | |
| 4,718,637 A | 1/1988 | Contin | |
| 5,087,017 A | * 2/1992 | Sawa et al. | 251/175 |
| 5,116,023 A | 5/1992 | Contin | |
| 5,356,113 A | * 10/1994 | Mizuishi et al. | 251/167 |
| 5,577,707 A | 11/1996 | Brida | |
| 5,975,492 A | * 11/1999 | Brenes | 251/175 |
| 2002/0056819 A1 | 5/2002 | Contin et al. | |

* cited by examiner

*Primary Examiner*—Edward K. Look
*Assistant Examiner*—John K. Fristoe, Jr.
(74) *Attorney, Agent, or Firm*—M. Henry Heines; Townsend and Townsend and Crew, LLP

(57) ABSTRACT

A valve achieves a high-vacuum seal and opens and closes with no sliding or otherwise abrading contact between the sealing plate and the valve seat, while maintaining pressure of the plate against the valve seat in the event of a failure in the valve actuation mechanism. These results are attained by use of a composite valve plate that includes a sealing plate joined to a support block through a retractable resilient connector. During retraction, the sealing plate is drawing close to the block by a pneumatic actuator internal to the composite valve plate, the actuator arranged to oppose and overcome a mechanical resilient element also contained within the valve plate that urges the sealing plate outward from the support block to effect the seal when the actuator is not engaged.

18 Claims, 7 Drawing Sheets

HIGH-VACUUM VALVE WITH RETRACTABLE VALVE PLATE TO ELIMINATE ABRASION

CROSS-REFERENCE TO RELATED APPLICATION

This application claims benefits from U.S. provisional patent application No. 60/397,917, filed Jul. 22, 2002, for all purposes legally served thereby. The contents of provisional patent application No. 60/397,917 are hereby incorporated herein by reference in their entirety.

BACKGROUND OF THE INVENTION

1. Field of the Invention

This invention resides in the field of high-vacuum valves and the structural features that are designed to prolong the useful life of such a valve and to eliminate or reduce the risk of introducing debris into procedures where such valves are used.

2. Description of the Prior Art

High-vacuum valves are critical equipment in a wide variety of procedures, ranging from analytical procedures to manufacturing processes. Particle physics experiments, x-ray tomography procedures, manufacturing processes for high-precision electronic components, and procedures involving the application of coatings by chemical vapor deposition are just examples of the many applications where high-vacuum valves are used. High-vacuum valves are particularly critical in semiconductor fabrication, where both high vacuum and a scrupulously clean environment are essential in achieving high-quality products. Other examples are flat panel displays, thin film magnetic switches, and optical switches. In procedures where a high-vacuum valve is opened and closed repeatedly, a valve that remains clean and performs reliably is even more critical since the opening and closing can cause wear and deterioration of the valve. In semiconductor fabrication, for example, high-vacuum valves are opened and closed repeatedly as semiconductor wafers are conveyed from the ambient environment to a high-vacuum chamber and back again.

High-vacuum valves of the prior art typically contain several moving parts that encounter friction and suffer abrasion and other types of wear. With extended use of these valves, the repeated abrasion produces debris, including metal debris that is microscopic in size. The presence of debris in a valve inevitably lowers the yield of acceptable products produced from equipment in which the valve is used. The moving parts often cause vibration as well, which further adds to the risk of low product quality. The need to discard products that do not meet specifications and to replace worn valves adds considerably to the manufacturing costs.

Another consideration that often arises in high-vacuum valves is the need to maintain the vacuum when a power failure or other event occurs that interferes with the actuation of the valve. An external force is typically needed to maintain the seal integrity when such an event occurs. The orientation of a high-vacuum valve is often a compromise between maintaining the seal integrity under these circumstances and prolonging the life of the valve. This complicates the construction of the valve.

SUMMARY OF THE INVENTION

The concerns enumerated above and others encountered in prior art high-vacuum valves are addressed by the present invention, which resides in a high-vacuum valve that is opened and closed with no contact between metal surfaces or any surfaces that might release particulate debris into the valve upon abrasion or sliding contact. The valve includes a valve body and a movable valve plate for opening and closing the valve, the plate being of composite construction that includes a support block and at least one plate mounted to the block, preferably a sealing plate on one side of the block and a second plate on an opposing side of the block, the plate(s) being retractable toward the block upon activation of a pneumatic actuator internal to the composite plate structure and releasable outward from the block upon deactivation or relaxation of the pneumatic actuator. When thus released outward, the sealing plate presses against a valve seat in the valve body, closing the valve and thereby allowing the valve to contain and hold a high vacuum. The second plate, when present, generally serves as a support plate for the block to counterbalance the force of the sealing plate on the support block. Thus, when the support plate is released outward, the support plate likewise presses against the valve body at a location opposing the valve seat against which the sealing plate is seated.

The pressure of each plate against the valve body is achieved by a biasing element located either inside the plate itself or the support block, the biasing element urging the plate and support block away from each other independently of the operation of the pneumatic actuator. When activated, the pneumatic actuator exerts a force that is in opposition to, and of a magnitude that exceeds, the force exerted by the biasing element. The pneumatic actuator thus draws or retracts the sealing plate (and the support plate when present) toward the block, unseating the sealing plate from the valve seat, and placing the plate(s) out of contact with valve body. Once the plate(s) are retracted, the composite valve plate can be moved to clear the flow passage and open the valve without sliding contact or other any contact between the plate(s) and the valve body. Closing of the valve is accomplished in likewise manner. Thus, to move the composite valve plate during either the opening or the closing of the valve, the pneumatic actuator is engaged with the effect of retracting the sealing plate, or both the sealing and support plates, toward the central block and out of contact with the valve body. Once the valve plate movement is completed, i.e., the valve is either fully opened or fully closed, the pneumatic actuator can be disengaged, releasing the plate(s) to their extended positions. In typical use of the valve, it is contemplated that the pneumatic actuator will remain engaged, and the plates retracted, while the valve plate is in any position other than the fully closed position.

The valve thus includes a source of pressurized fluid, channels in the valve body for the transmission of the pressurized fluid to the pneumatic actuator, and supply valves, preferably remotely controlled and preferably electronically actuated, in the pneumatic channels for communicating the pressurized fluid source with the actuator and for releasing pressure from the passages and actuator upon command.

By eliminating all abrading contact between parts in the flow channel of the valve during the opening and closing of the valve, the valve offers a reduction in vibration, particle formation, noise, and wear, in addition to lesser friction and therefore a greater ease of movement during the opening and closing of the valve. The result is a cleaner operating environment within the vacuum chamber whose vacuum is maintained by the valve, and accordingly a higher yield of acceptable products and a longer operating life for the valve. The features of this invention can be incorporated in valves of a large range of sizes, with potentially greater benefits in terms of sealing force as the valve size increases since the number of biasing elements can be varied to suit the size of the valve plate. The number of pneumatic actuators can likewise be varied and thus the valve plate can be moved easily during opening and closing regardless of the size or shape of the valve plate or its direction of movement. The invention is therefore applicable to any high-vacuum valve that has a movable valve plate. Examples are pendulum valves, gate valves, and slide valves, as well as valves with rectangular plates, circular plates, or plates of any other shape.

The features set forth above and others included in the various embodiments of the invention are more readily understood by the description that follows.

DETAILED DESCRIPTION OF THE INVENTION AND PREFERRED EMBODIMENTS

While this invention is susceptible to a large number of implementations, embodiments, and configurations, the basic elements of the invention and how they can be implemented in different valve types and constructions will be best understood from a detailed examination of specific embodiments. Such embodiments are shown in the attached drawings and explained below.

Figure 1:
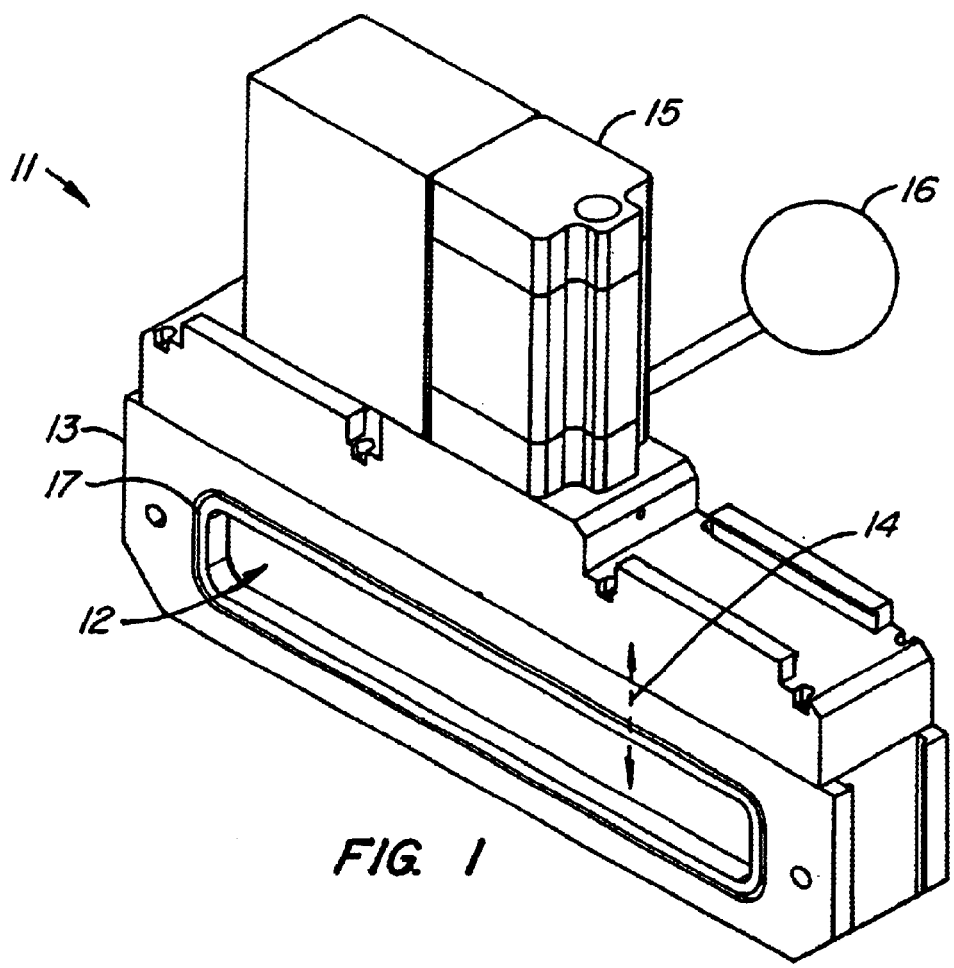
FIG. 1 is a perspective view of a high-vacuum gate valve in accordance with the present invention, with a rectangular flow passage and valve opening.

The valve shown in FIG. 1 is a gate valve 11 with a flow channel 12 of rectangular cross section. The valve plate, not visible in this view, is inside the valve body 13 and opens and closes by moving up and down within the valve body in the direction shown by the dashed arrow 14. A tower 15 extends above the valve housing to contain circuitry, flow channels supplying pressurized air to the pneumatic actuators (which are shown in subsequently numbered drawings and explained below), actuator valves for turning the pressurized air on or off, and other components that drive and control the movement of the valve plate for opening and closing the valve. A source of pressurized air 16 is represented symbolically. A groove 17 is shown in the exterior face of the valve body surrounding the opening of the flow channel 12. The groove accommodates an O-ring or other seal to provide a fluid-tight connection between the valve body and other conduits or components to which the valve is connected for use in the manufacturing process.

Figure 2:
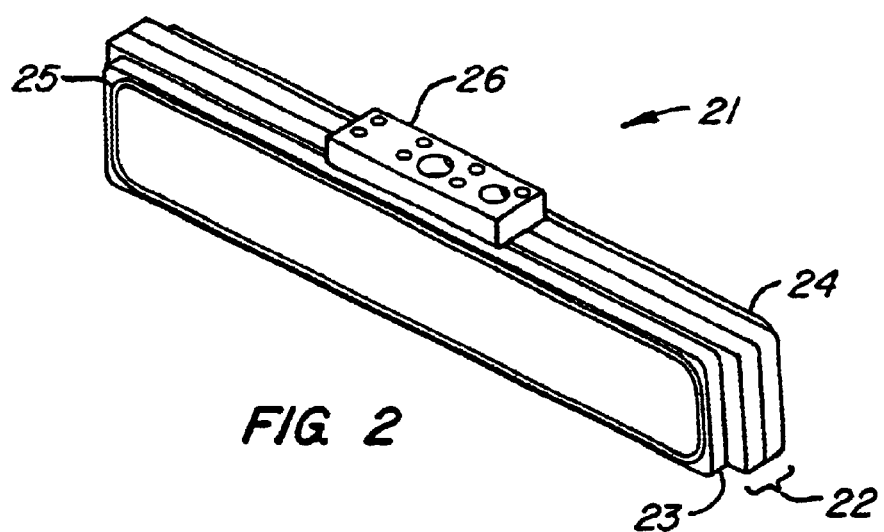
FIG. 2 is a perspective view of a composite valve plate that is a component of the gate valve of FIG. 1.

The valve plate 21 is shown in FIG. 2. The plate is a composite structure that includes a central support block 22 and two retractable plates 23, 24, one on each side of the central block. The front plate 23 in the view shown in this drawing is a sealing plate or gate, which seats against the interior of the opening of the flow channel 12 in the valve body (FIG. 1) and holds the vacuum. The back plate 24 is a support plate or gate support, which lodges against the interior of the opposite opening of the flow channel 12 as support for both the sealing plate 23 and the central block 22, balancing the force on the block exerted by the sealing plate. Each plate contains a peripheral groove (only the sealing plate groove 25 being visible in this view) to receive an O-ring or an equivalent thereof to form the seal. Affixed to the top of the central block 22 is an adaptor plate 26 that joins the pressurized fluid passages in the tower 15 (FIG. 1) to the passages in the composite valve plate that supply the pressurized fluid to the pneumatic actuators. The adaptor plate also provides structural connections for movable shafts to which the valve plate is mounted for opening and closing of the valve.

Figure 3A:
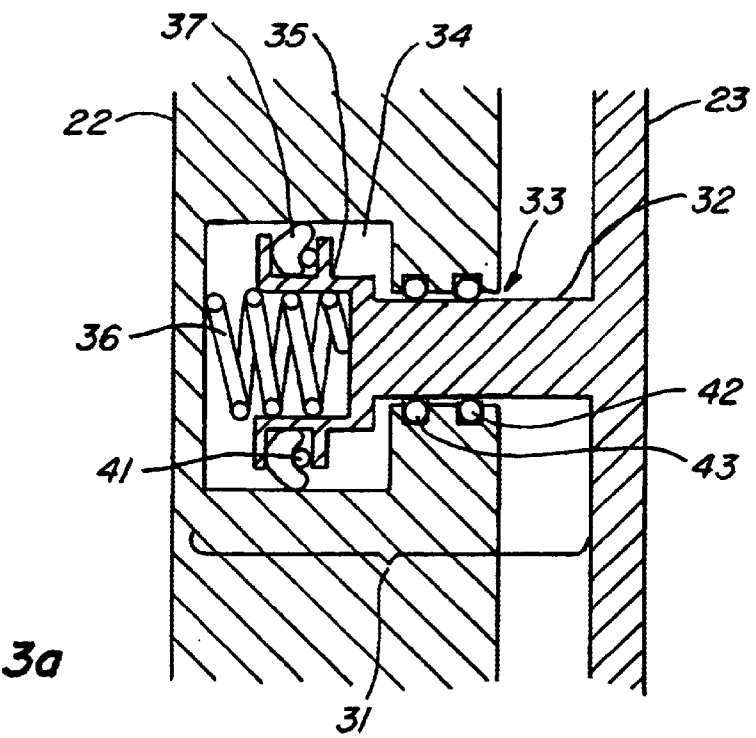
FIG. 3a is a cross section view of a pneumatic actuator serving as a component of the composite valve plate FIG. 2, the actuator shown in a relaxed condition.
Figure 3B:
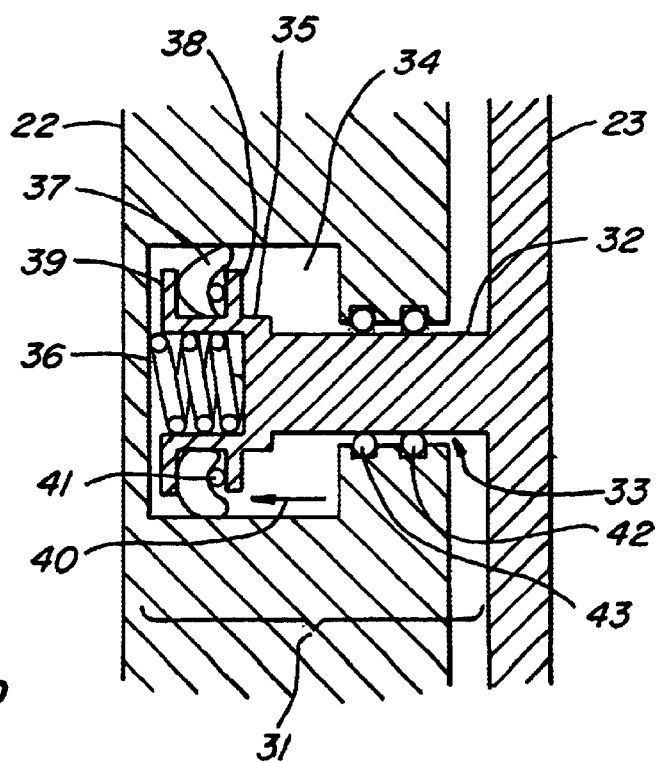
FIG. 3b is another cross section view of the pneumatic actuator of FIG. 3a shown in an activated condition.

FIGS. 3a and 3b present enlarged views of portions of the central support block 22 and the sealing plate 23, illustrating the connector that joins these two components together. The same type of connector joins the support block to the support plate 24 (FIG. 2) on the opposite side of the block. The connector is a resilient connector 31 by virtue of its ability to be compressed as shown in FIG. 3b, drawing the sealing plate 23 inward toward the block 22, and to then return to its full length as shown in FIG. 3a upon release, drawing the plate and block apart from each other. The connector in this embodiment includes a shaft 32, one end of which is rigidly affixed to the sealing plate 23 while the other end extends into the block 22 through a portal 33 in the block that leads to a chamber 34 inside the block. The shaft 32 terminates in an expanded cup 35 inside the chamber 34. Retained inside the cup is a coil spring 36 that exerts a force that elongates the connector 31 and provides the connector with its resilient character. The coil spring is but one example of a resilient component; any component that can be compressed and exerts an expanding force when compressed can be used. Alternatives to the coil spring are Bellville washers, flat wire springs, and bellows springs, all of which are common items readily available from commercial equipment suppliers. Further examples will be readily apparent to those skilled in the art of valves and mechanical components. When the coil spring is extended as shown in FIG. 3a, the sealing plate 23 presses against the valve seat in the valve body, ready to seal and contain a vacuum on one side of the valve.

Compression of the coil spring 36 and retraction of the sealing plate 23 toward the support block 22 is achieved by the pneumatic actuator through the application of pneumatic pressure inside the chamber 34. The components of the pneumatic actuator are the chamber 34, a dynamic seal 37 inside the chamber, and supply conduits for pressurized fluid. The dynamic seal 37 is a seal that is capable of movement while retaining the seal, and can assume the form of a gasket, an O-ring, or other seals known in the art and widely available. The dynamic seal 37 encircles the outer surface of the cup 35 to seal the gap between the cup 35 and the inner wall of the chamber 34. The seal 37 is held in position on the outer surface of the cup by a pair of flanges 38, 39. Pneumatic pressure is applied by supplying pressurized air or other fluid to the chamber on the side of the dynamic seal 37 that faces the sealing plate 23, thereby exerting pressure on the dynamic seal 37 in the direction shown by the arrow 40 (FIG. 3b). This side of the dynamic seal is referred to herein as the high-pressure side while the opposing side is referred to herein as the low-pressure side. The resulting pressure differential across the seal 37 forces the seal and hence the shaft further into the chamber 34 and thereby draws the sealing plate 23 closer to the support block 22. Pressurized fluid is supplied to the high-pressure side of the dynamic seal through appropriate conduits in the block, which are not shown in FIGS. 3a and 3b.

While the components of the pneumatic actuator in the embodiment shown in FIGS. 3a and 3b are contained in the support block 22, the structure can be reversed by placing these components in the sealing plate 23. For ease of manufacture, it is preferred to place these components in the support block 22 as shown. This is particularly true when a plurality of pneumatic actuators are included, all fed by a common source of pressurized fluid through connected supply conduits.

In further preferred embodiments of the invention, the dynamic seal 37 is one that maintains a pressure differential in one direction only, i.e., from the high-pressure side of the seal to the low-pressure side. Such a seal will release accumulated excess pressure from the low-pressure side of the seal when that accumulated pressure exceeds the pressure on the high-pressure side. When the pneumatic actuator is deactivated, for example, the pressure on the high-pressure side drops to approximately atmospheric pressure, and if the pressure on the low-pressure side of the seal exceeds atmospheric pressure, the seal will allow the excess pressure to bleed into the high-pressure side. This preferred feature is effective in preventing pressure accumulation on the low-pressure side arising from the leakage of pressurized fluid across the seal during repeated pressurization and depressurization cycles. This is particularly useful in keeping the valve in functional condition upon repeated activation and deactivation of the pneumatic actuator. The seal that produces this effect in this particular embodiment is a U-cup seal, i.e., a seal with a U-shaped cross section as shown in FIGS. 3a and 3b, in which the opening of the U faces the high-pressure side. Pressure from the high-pressure side tends to open the U further and spread the seal, thereby forcing the seal further against the walls of the chamber, while pressure from the low-pressure side tends to close the U, allowing sufficient fluid to pass the seal to equalize the pressures on both sides. An O-ring 41 resides in the concave side of the U-cup in this particular embodiment to pre-load the U-cup by urging it outward against the wall of the chamber. The size and density of the O-ring are selected such that excess pressure will still be released across the U-cup in the opposite direction when the pressure on the convex side exceeds the pressure on the concave side.

A further set of dynamic seals 42, 43 surround the shaft 32 sealing the gap between the shaft and the walls of the portal 33. These shaft seals retain their sealing function during movement of the shaft through the portal. Unlike the dynamic seal 37 inside the chamber 34, however, the shaft seals 42, 43 are not designed to release accumulated pressure on one side since such a need does not exist around the shaft. The shaft seals serve to contain the pneumatic pressure inside the chamber 34 when the pressure is applied while allowing the shaft to move. The type of seal used for the shaft seals and the shape of the seal cross section are not critical other than to maintain the desired seal. A presently preferred seal is a QUAD RING® (Sealing Devices, Inc., Lancaster, N.Y., USA), i.e., a ring with a profile shaped approximately like a four-leaf clover, providing two sealing surfaces on each side. Alternatives are bellows seals and any of the numerous other sliding seals known to those of skill in the art.

The number of retractable resilient connectors such as those depicted in FIGS. 3a and 3b that are included in any single high-vacuum valve of this invention may vary and is not critical to the invention itself. For an evenly distributed sealing force, a plurality of these connectors will generally be used and are preferred. The appropriate number in any particular case will depend on the size and shape of the valve plate and the type of valve. Preferably, the connectors will be symmetrically arranged around the seal plate, and in many cases, evenly spaced around the periphery of the seal plate. In embodiments in which these connectors are used on both sides of the central support block for retractably joining a plate to each side, the number and arrangement of connectors on each side can be the same or different. The connectors on one side can either directly oppose those on the other or the two sets may be in a staggered arrangement with connectors on one side alternating with those on the other. This alternating arrangement offers the advantage of reducing the volume of the structure, particularly when the pneumatic actuators are formed in the central block.

Figure 4:
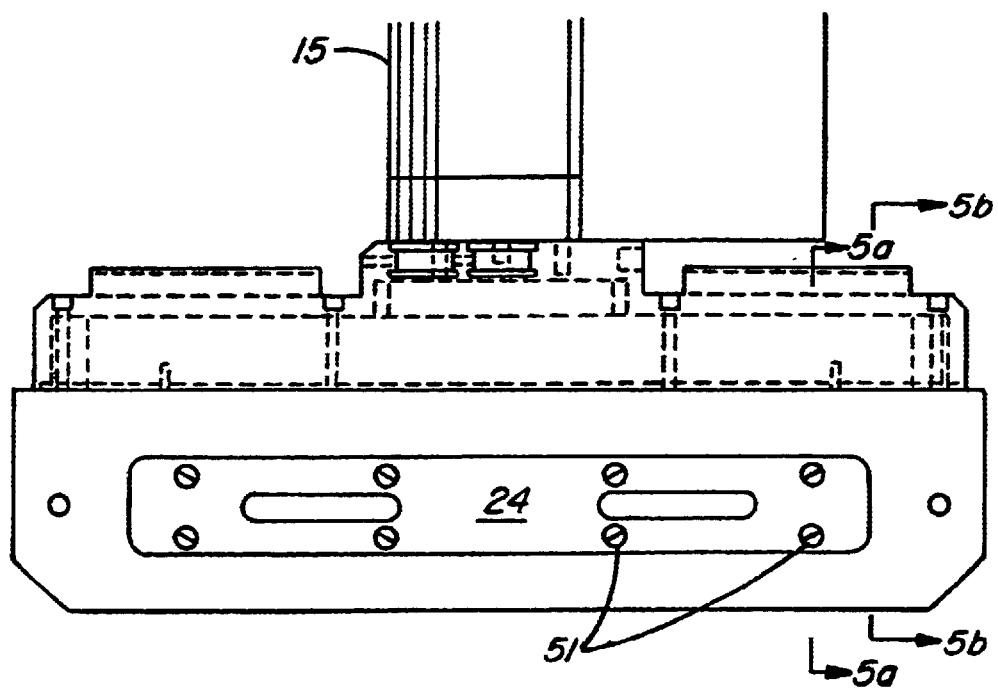
FIG. 4 is a front elevation of the high-vacuum gate valve of FIG. 1.

FIG. 4 is an illustration of an effective arrangement of retractable resilient connectors around the plate of the rectangular gate valve of FIG. 1. The support plate 24 (i.e., the gate support) is visible through the valve opening. The screw heads 51 indicate the locations of shafts of the connectors that join the support plate 24 to the central block. Eight connectors are shown, arranged in two evenly spaced rows of four connectors each, one near the top edge of the plate and the other near the bottom edge. On the opposite side, eight further connectors (not shown) join the sealing plate (i.e., the gate) to the central block. These connectors are likewise evenly spaced in two rows, one near the top edge and the other near the bottom edge. The support plate connectors in each row alternate with the sealing plate connectors in the corresponding row on the opposite side.

Figure 5A:
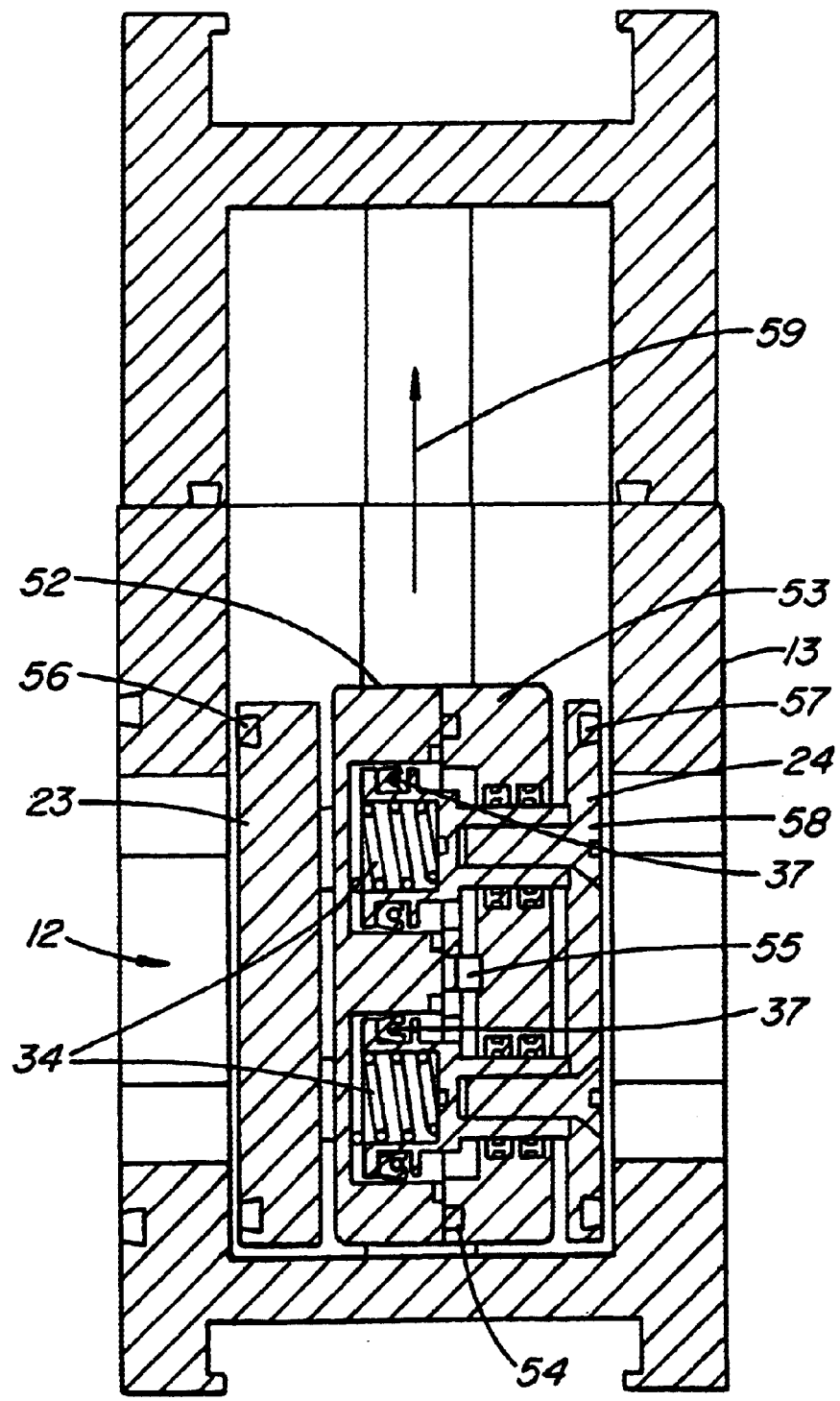
FIG. 5a is a cross section of the high-vacuum gate valve of FIG. 1 taken along the line 5a—5a of FIG. 4.
Figure 5B:
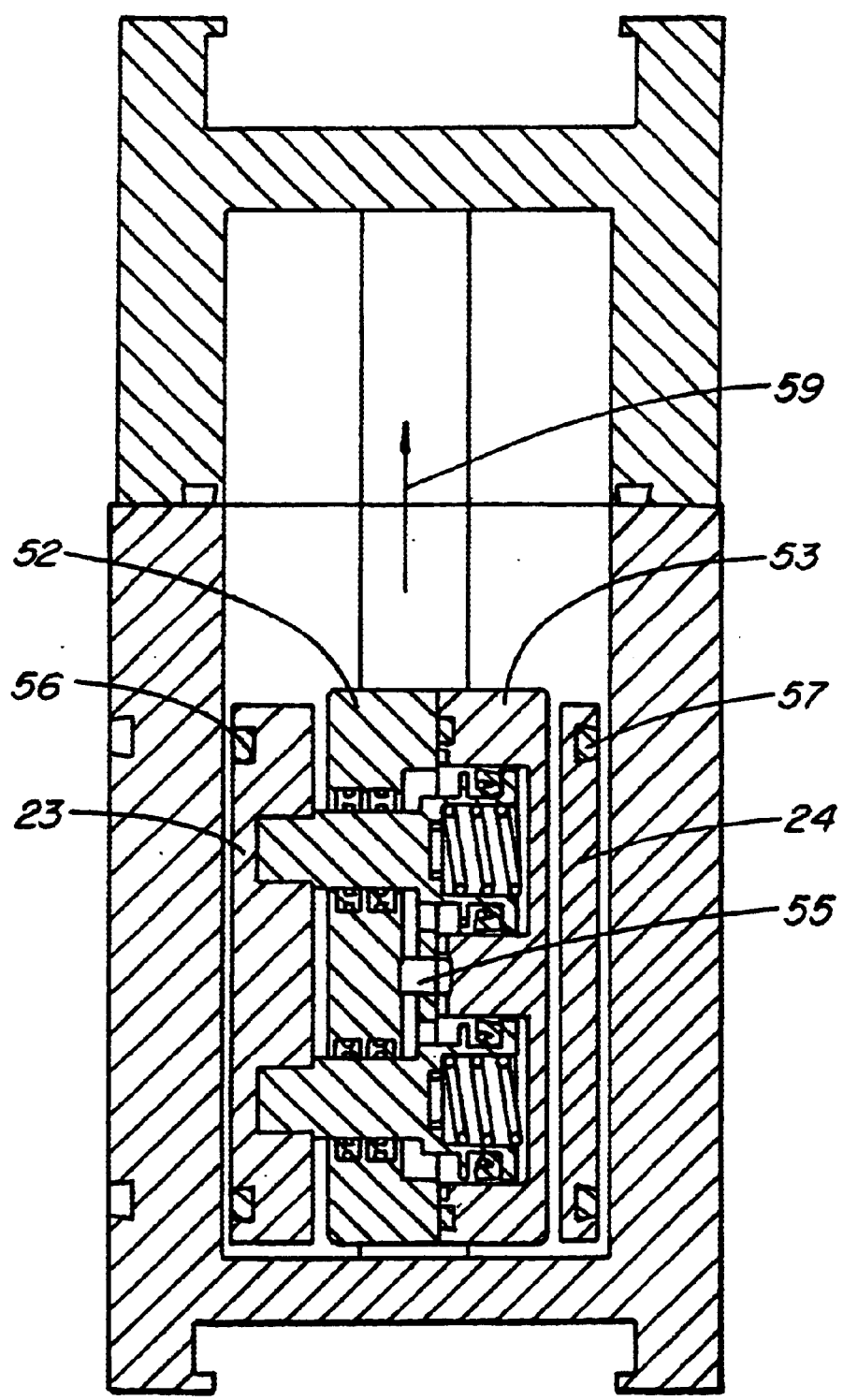
FIG. 5b is a cross section of the high-vacuum gate valve of FIG. 1 taken along the line 5b—5b of FIG. 4.

The connectors themselves and their orientations within the composite valve plate are shown in the cross sectional views of FIGS. 5a (taken along the line 5a—5a of FIG. 4) and 5b (taken along the line 5b—5b of FIG. 4). FIG. 5a shows two connectors joining the support plate 24 to the central block, one connector from the each of the top and bottom rows. Likewise, FIG. 5b shows one connector from each of the top and bottom rows joining the sealing plate 23 to the central block. Both Figures show that the central block is formed in two halves 52, 53 to form the chamber 34 and to facilitate the insertion of the pneumatic actuator components into the chamber, the two halves being sealed together by an elastomeric seal or O-ring 54. A common conduit 55 supplies pressurized air to the chamber 34 of each pneumatic actuator on the high-pressure side of the U-cup seal 37. Elastomeric loops 56, 57 extend along the periphery of each of the two plates on the outer surfaces of the plates to contact the inner walls of the valve body. The arrangement and orientation of the connectors, including the rods, coil springs, seals, and chambers in FIG. 5b are essentially the mirror image of those of FIG. 5a, the major distinction being a difference in thickness between the sealing plate 23 and the support plate 24. Since the support plate 24 is relatively thin, each connector shaft affixed to the support plate is joined to the support plate by a flathead screw 58 passing through the support plate (FIG. 5a), whereas on the sealing plate side, each connector shaft is threaded directly into the sealing plate (FIG. 5b). These features are designed only for ease of assembly.

The valve is shown in a closed position in both FIGS. 5a and 5b, with the composite valve plate traversing the valve flow channel 12. Opening of the valve, once the plates 23, 24 are retracted against the central block 22, is achieved by raising the entire composite valve plate upward within the body of the valve, in the direction shown by the arrow 59. The opening and closing of the valve in this manner, as well as the activation and deactivation of the pneumatic actuators to retract and release the sealing and support plates, are achievable by any conventional methods well known in the art of actuators, particularly remotely controlled actuators. Thus, the movement of the composite valve plate in the opening and closing of the valve may itself be effected by a pneumatic system that is separate from, but preferably coordinated with, the pneumatic system that controls the retraction and release of the seal and support plates, although alternative mechanisms can be used as well. For example, any motor-controlled valve, such as an eclectic motor valve, can be used, and the valve plate position can be infinitely variable or offer a range of positions, including partially open positions.

For the activation and deactivation of the pneumatic actuators, any conventional means of opening and closing pressure supply and relief lines can be used. A common and convenient method is the use of solenoid valves, the many types and configurations of which are well known to those skilled in the art, as are alternative means that serve the same or an equivalent function. Any such means can be used in the implementation and practice of the present invention.

Figure 6A:
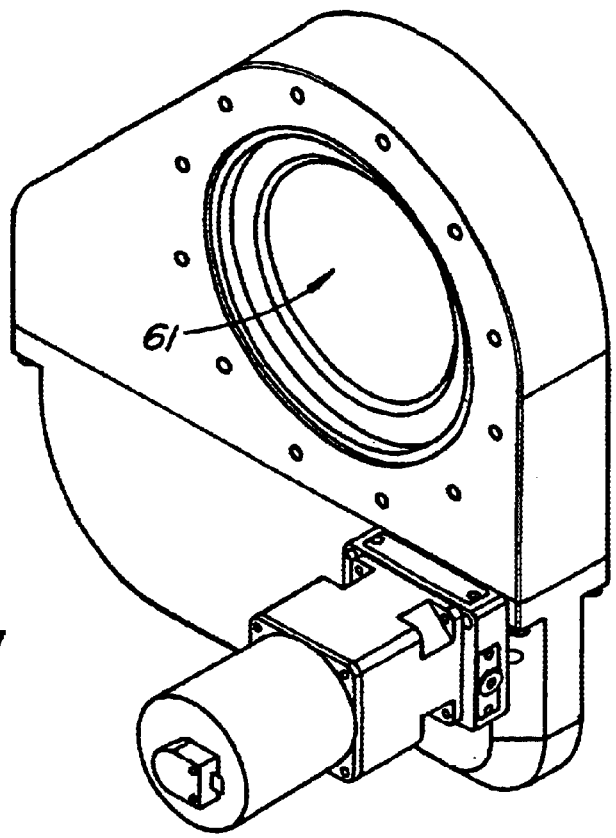
FIG. 6a is a perspective view of a high-vacuum pendulum valve in accordance with the present invention.
Figure 6B:
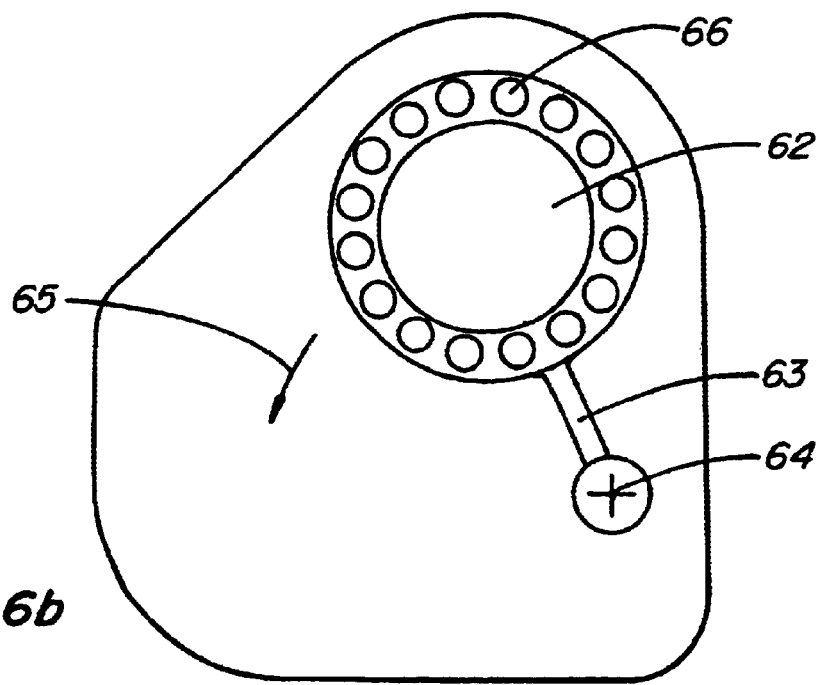
FIG. 6b is a cross section of the interior of the high-vacuum pendulum valve of FIG. 6a showing the composite valve plate.

While the description above is directed to a gate valve with a rectangular flow passage and gate, and in which the gate is moved in a linear direction for opening and closing, the invention is likewise applicable to valves of other configurations and directions of movement. A pendulum valve, for example, is depicted in FIGS. 6a and 6b. In this valve, the valve opening 61 (FIG. 6a) and sealing plate 62 (FIG. 6b) are circular, and the sealing plate is mounted to a pivot arm 63 which pivots about a pivot axis 64. The sealing plate 62 therefore moves along an arc as shown by the arrow 65 in FIG. 6b. As in the rectangular gate valve of the preceding figures, the sealing plate 62 is a composite plate that includes a central block (not shown) and at least one outer plate that forms the seal against the valve body, or preferably an outer plate on each side of the central block, the second plate supporting the central block as the sealing plate presses against the valve body at the valve seat. A series of retractable resilient connectors 66 are evenly distributed around the periphery of the sealing plate 62, each functioning in the same manner as the retractable resilient connectors of the rectangular gate valve of the preceding figures. When a second plate is present, an equal number of resilient retractable connectors join that plate to the central block, the two sets of connectors being staggered around the periphery of the plate.

Figures 7A, 7B:
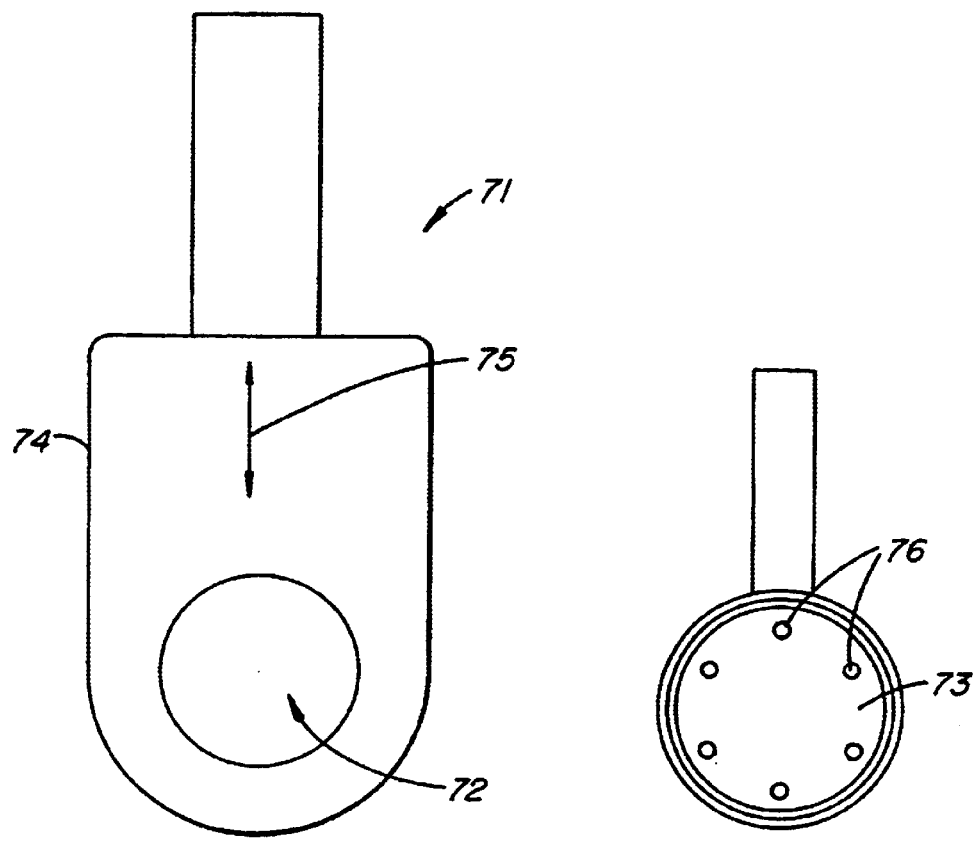
FIG. 7a is a front elevation of a high-vacuum gate valve in accordance with the present invention with a circular valve opening and valve plate.
FIG. 7b is a front elevation of the valve plate of the high-vacuum gate valve of FIG. 7a showing the composite valve plate.

A further example is depicted in FIGS. 7a and 7b, which illustrate a gate valve 71 with a circular flow channel 72 (FIG. 7a) and circular valve plate 73 (FIG. 7b). The valve body 74 (FIG. 7a) is elongated to allow the valve plate to move along a linear path of travel inside the valve body in the direction indicated by the arrow 75. The valve plate 73 is a composite plate that includes a central block (not shown) and at least one outer plate (visible in FIG. 7b) that forms the seal against the valve body, or preferably an outer plate on each side of the central block as in the configurations discussed above. A series of retractable resilient connectors 76 are evenly distributed around the periphery of the sealing plate 73, each functioning in the same manner as the retractable resilient connectors of the rectangular gate valve and the pendulum valve of the preceding figures.

The foregoing descriptions are offered primarily for purposes of illustration. Variations in component shapes, configurations, and arrangements beyond those described herein, which are likewise encompassed by the invention, will be suggested to those skilled in the art.

What is claimed is:

1. A high-vacuum valve comprising
   a valve body having a flow channel;
   a composite valve plate disposed within said valve body and movable in a direction transverse to said flow channel between a closed position traversing said flow channel to prevent flow therethrough and an open position sufficiently clearing said flow channel to permit flow therethrough, said composite valve plate comprising:
   a seal plate;
   a support block;
   a resilient connector having a first end affixed to one of said seal plate and said support block and a second end terminating in a chamber in the other of said seal plate and said support block, said resilient connector arranged such that when relaxed said resilient connector exerts an expanding force urging said seal plate and said support block apart;
   sealing means disposed between said second end of said resilient connector and inner walls of said chamber; and
   a passageway arranged to supply pressurized fluid to one side of said sealing means to thereby impose across said sealing means a pressure differential that compresses said resilient connector in opposition to said expanding force and thereby urges said seal plate and said support block toward each other; and
   means for supplying pressurized fluid to said passageway and for releasing pressurized fluid therefrom upon command.

2. The high-vacuum valve of claim 1 in which said first end of said resilient connector is affixed to said seal plate and said chamber is in said support block.

3. The high-vacuum valve of claim 2 in which said resilient connector comprises a shaft connecting said first and second ends, said sealing means are defined as first sealing means, and said high-vacuum valve further comprises second sealing means between said shaft and said support block, said second sealing means providing a sliding seal to allow said shaft to move relative to said support block while retaining fluid pressure within said chamber.

4. The high-vacuum valve of claim 2 in which said second end of said resilient connector is a cup with a coil spring retained therein and protruding therefrom, and said sealing means is a resilient ring encircling said cup.

5. The high-vacuum valve of claim 4 in which said one side of said sealing means is defined as a high-pressure side and the side opposing said high-pressure side is defined as a low-pressure side, and said resilient ring has a groove on said high-pressure side such that closing of said groove allows release any fluid pressure accumulated on said low-pressure side.

6. The high-vacuum valve of claim 1 in which said resilient connector comprises a shaft terminating in a coil spring at said second end.

7. The high-vacuum valve of claim 1 comprising a plurality of said resilient connectors whose first ends are all affixed to one of said seal plate and said support block and whose second ends each terminate in individual chambers in the other of said seal plate and said support block.

8. The high-vacuum valve of claim 1 comprising a plurality of said resilient connectors whose first ends are all affixed to said seal plate and whose second ends each terminate in individual chambers in said support block, and sealing means disposed between each of said second ends and the inner walls of each of said chambers.

9. The high-vacuum valve of claim 8 in which said passageway is arranged to supply pressurized fluid from a common source to all of said sealing means.

10. The high-vacuum valve of claim 1 in which said seal plate is defined as a first seal plate, said resilient connector is defined as a first resilient connector, and said composite valve plate further comprises a second seal plate and a second resilient connector, said first and second resilient connectors joining said first and second seal plates respectively to said support block with said first and second seal plates on opposing sides of said support block.

11. The high-vacuum valve of claim 10 in which said first end of said first resilient connector is affixed to said first seal plate, said first end of said second resilient connector is affixed to said second seal plate, and said second ends of both said first and second resilient connectors terminate in chambers in said support block.

12. The high-vacuum valve of claim 10 comprising a plurality of said first resilient connectors and a plurality of said second resilient connectors, said first ends of each of said plurality of first resilient connectors are affixed to said first seal plate, said first ends of each of said second resilient connector are affixed to said second seal plate, and said second ends of all of said resilient connectors terminate in chambers in said support block.

13. The high-vacuum valve of claim 12 in which said passageway is arranged to supply pressurized fluid from a common source to all of said sealing means.

14. The high-vacuum valve of claim 12 in which said seal plate is a circular plate, said plurality of first resilient connectors are distributed around the periphery of one side of said circular plate, and said plurality of second resilient connectors are distributed around the periphery of the other side of said circular plate, said first and second pluralities of resilient connectors arranged in alternating configuration.

15. The high-vacuum valve of claim 12 in which said seal plate is a rectangular plate, said plurality of first resilient connectors are distributed around the periphery of one side of said rectangular plate, and said plurality of second resilient connectors are distributed around the periphery of the other side of said rectangular plate, said first and second pluralities of resilient connectors arranged in alternating configuration.

16. The high-vacuum valve of claim 1 in which said high-vacuum valve is a pendulum valve in which said seal plate is a circular plate at one end of a pivot arm with a pivot axis at the other end of said pivot arm, said composite valve plate being movable by rotation of said pivot arm about said pivot axis.

17. The high-vacuum valve of claim 1 in which said high-vacuum valve is a gate valve in which said seal plate is a circular plate at one end of an extension arm having a longitudinal axis, said composite valve plate being movable by linear movement of said extension arm along said longitudinal axis.

18. The high-vacuum valve of claim 1 in which said high-vacuum valve is a rectangular valve in which said seal plate is a rectangular plate joined to an extension arm having a longitudinal axis, said composite valve plate being movable by linear movement of said extension arm along said longitudinal axis.

* * * * *